United States Patent
Rothschild et al.

(10) Patent No.: US 12,511,267 B2
(45) Date of Patent: Dec. 30, 2025

(54) METHOD AND SYSTEM FOR CREATING AND REMOVING A TEMPORARY SUBUSER OF A COMPUTING DEVICE

(71) Applicant: Dell Products L.P., Round Rock, TX (US)

(72) Inventors: Seth Jacob Rothschild, Littleton, MA (US); Benjamin Edward Santaus, Somerville, MA (US)

(73) Assignee: Dell Products L.P., Round Rock, TX (US)

( * ) Notice: Subject to any disclaimer, the term of this patent is extended or adjusted under 35 U.S.C. 154(b) by 39 days.

(21) Appl. No.: 18/181,264

(22) Filed: Mar. 9, 2023

(65) Prior Publication Data

US 2024/0303225 A1    Sep. 12, 2024

(51) Int. Cl.
*G06F 16/18* (2019.01)
*G06F 16/11* (2019.01)

(52) U.S. Cl.
CPC ........ *G06F 16/1873* (2019.01); *G06F 16/128* (2019.01)

(58) Field of Classification Search
CPC ............................ G06F 16/1873; G06F 16/128
See application file for complete search history.

(56) References Cited

U.S. PATENT DOCUMENTS

| | | | |
|---|---|---|---|
| 7,356,843 B1* | 4/2008 | Kingsford | G06F 21/552 707/999.2 |
| 2015/0106335 A1* | 4/2015 | Hunt | G06F 16/128 707/639 |
| 2015/0150142 A1* | 5/2015 | Austin | G06F 16/1734 726/26 |
| 2020/0133786 A1* | 4/2020 | Ramabhadran | G06F 11/1451 |
| 2023/0198991 A1* | 6/2023 | Boehme | H04L 63/105 726/1 |

FOREIGN PATENT DOCUMENTS

WO    WO-03083670 A1 * 10/2003    ......... G06F 21/6218

OTHER PUBLICATIONS

Milica Dancuk, "How to Create/Add Users in Linux", https://phoenixnap.com/kb/linux-user-create, Jul. 26, 2022 (Year: 2022).*

* cited by examiner

*Primary Examiner* — Sherief Badawi
*Assistant Examiner* — Earl Levi Elias
(74) *Attorney, Agent, or Firm* — Chamberlain, Hrdlicka, White, Williams & Aughtry; Aly Z. Dossa

(57) ABSTRACT

Techniques described herein relate to a method for managing user device users. The method includes, in response to obtaining a subuser account creation request: obtaining subuser arguments from a user of a user device specifying: a folder of a user file system, and a subuser; generating a subuser account for the subuser and setting subuser permissions based on the subuser arguments; generating a snapshot of the folder; updating a version control directory in the folder with the snapshot; removing the version control directory from the folder; associating user configuration files to the subuser account; and initiating subuser access of the folder based on the subuser permissions and the user configuration files, wherein the subuser is allowed to make modifications to at least one file included in the folder using the subuser account.

16 Claims, 5 Drawing Sheets

METHOD AND SYSTEM FOR CREATING AND REMOVING A TEMPORARY SUBUSER OF A COMPUTING DEVICE

BACKGROUND

Computing devices may provide services for users. To provide the services, the computing devices may generate data. The computing devices may provide and obtain data from other computing devices. Users may desire to share data with other users. The other users may access the data on the users' computing devices.

SUMMARY

In general, certain embodiments described herein relate to a method for managing user device users. The method may include, in response to obtaining a subuser account creation request: obtaining subuser arguments from a user of a user device specifying: a folder of a user file system, and a subuser; generating a subuser account for the subuser and setting subuser permissions based on the subuser arguments; generating a snapshot of the folder; updating a version control directory in the folder with the snapshot; removing the version control directory from the folder; associating user configuration files to the subuser account; and initiating subuser access of the folder based on the subuser permissions and the user configuration files, wherein the subuser is allowed to make modifications to at least one file included in the folder using the subuser account.

In general, certain embodiments described herein relate to a system for managing user device users. The system includes a user device and a subuser agent of the user device that is configured to, in response to obtaining a subuser account creation request: obtain subuser arguments from a user of a user device specifying: a folder of a user file system, and a subuser; generate a subuser account for the subuser and setting subuser permissions based on the subuser arguments; generate a snapshot of the folder; update a version control directory in the folder with the snapshot; remove the version control directory from the folder; associate user configuration files to the subuser account; and initiate subuser access of the folder based on the subuser permissions and the user configuration files, wherein the subuser is allowed to make modifications to at least one file included in the folder using the subuser account.

In general, certain embodiments described herein relate to a non-transitory computer readable medium that includes computer readable program code, which when executed by a computer processor enables the computer processor to perform a method for managing user device users. The method may include, in response to obtaining a subuser account creation request: obtaining subuser arguments from a user of a user device specifying: a folder of a user file system, and a subuser; generating a subuser account for the subuser and setting subuser permissions based on the subuser arguments; generating a snapshot of the folder; updating a version control directory in the folder with the snapshot; removing the version control directory from the folder; associating user configuration files to the subuser account; and initiating subuser access of the folder based on the subuser permissions and the user configuration files, wherein the subuser is allowed to make modifications to at least one file included in the folder using the subuser account.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

DETAILED DESCRIPTION

Figure 1A:
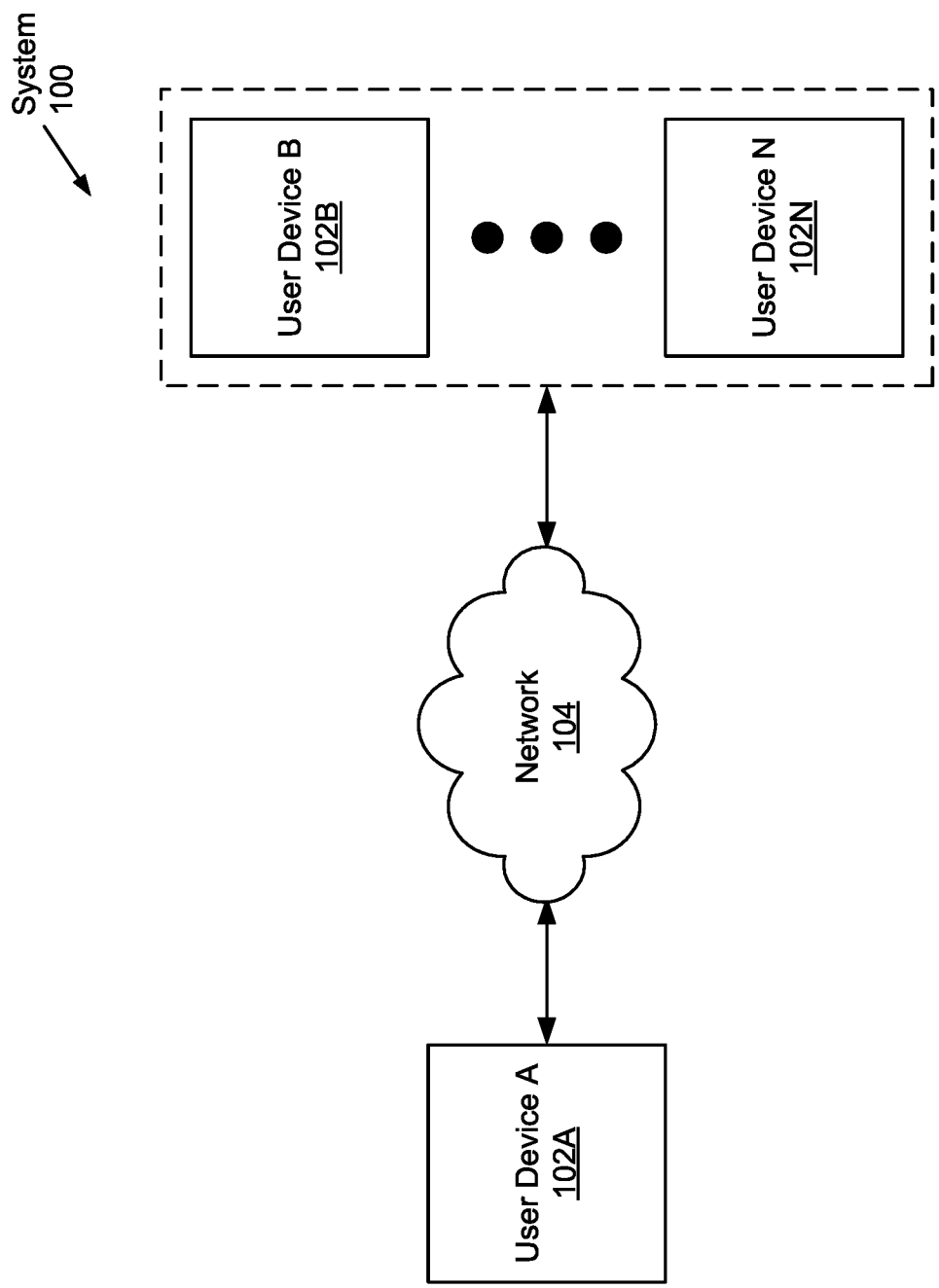
FIG. 1A shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure and the number of elements of the second data structure may be the same or different.

In general, embodiments disclosed herein relate to methods, systems, and non-transitory computer readable mediums for creating a temporary subuser on a computing device.

Users of computing devices may want to share files on their computing device with other users. Traditionally, several approaches have been used to share files on a computing device. First, users may share their account credentials with other users to grant access of the files on their computing device to other users through the original user's account. This approach generates massive privacy concerns and makes it difficult to determine which user actually made changes to the files since both users are using the same account. Second, users may directly share the file to another user's computing device. However, in software development scenarios, project files created on one computing device with one set of configuration settings may experience incompatibility issues or run differently on another computing device.

To address, at least in part, the aforementioned issues, embodiments disclosed herein relate to generating a temporary subuser account on a user device that has limited access to only a folder that the user of the user device wishes to share with the subuser. In one or more embodiments, as used herein, a subuser may refer to a temporary user account on a user device which mimics a subset of the permissions and configurations of an existing user. The subuser account may also be associated with limited permissions to perform only operations on the folder and its files that are desired by the user. Furthermore, the subuser account may then be removed following a removal event so the subuser does not have access longer than the user desires. Embodiments disclosed herein also enable the user to accept or reject the modifications to the folder made by the subuser, and, if desired, restore the folder to its state prior to subuser access. As a result, a user may share a folder on their user device with another user as a subuser while maintaining both privacy of other information on the user device and control over the subuser's actions on the user device.

FIG. 1A shows a system in accordance with one or more embodiments disclosed herein. The system (100) may include one or more user devices (102A-102N) operatively connected to a backup storage system (106). Each of these system (100) components is described below.

In one or more embodiments disclosed herein, the above-mentioned system (100) components may operatively connect to one another through a network (104) (e.g., a local area network (LAN), a wide area network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment or more embodiments, a user device (102A-102N) may represent any physical appliance or computing device designed and configured to receive, generate, process, store, and/or transmit digital data, as well as to provide an environment in which one or more computer programs may execute thereon. The computer programs (not shown) may, for example, implement large-scale and complex data processing; or implement one or more services offered locally or over the network (104). Further, in providing an execution environment for any computer programs installed thereon, a user device (102A-102N) may include and allocate various resources (e.g., computer processors, memory, storage, virtualization, network bandwidth, etc.), as needed, to the computer programs and the tasks (or processes) instantiated thereby. One of ordinary skill will appreciate that a user device (102A-102N) may perform other functionalities without departing from the scope of embodiments disclosed herein. Examples of a user device (102A-102N) may include, but are not limited to, a desktop computer, a laptop computer, a server, a mainframe, or any other computing device similar to the exemplary computing device shown in FIG. 3. Moreover, user devices (102A-102N) are described in further detail below with respect to FIG. 1B.

Although the system of FIG. 1A is shown as having a certain number of components (e.g., 102A-102N, 104), in other embodiments disclosed herein, the system may have more or fewer components. For example, the functionality of each component described above may be split across components or combined into a single component. In such a scenario, one or more user devices may operate a virtual machines on a single computing device (e.g., server). Further still, each component may be utilized multiple times to carry out an iterative operation.

Figure 1B:
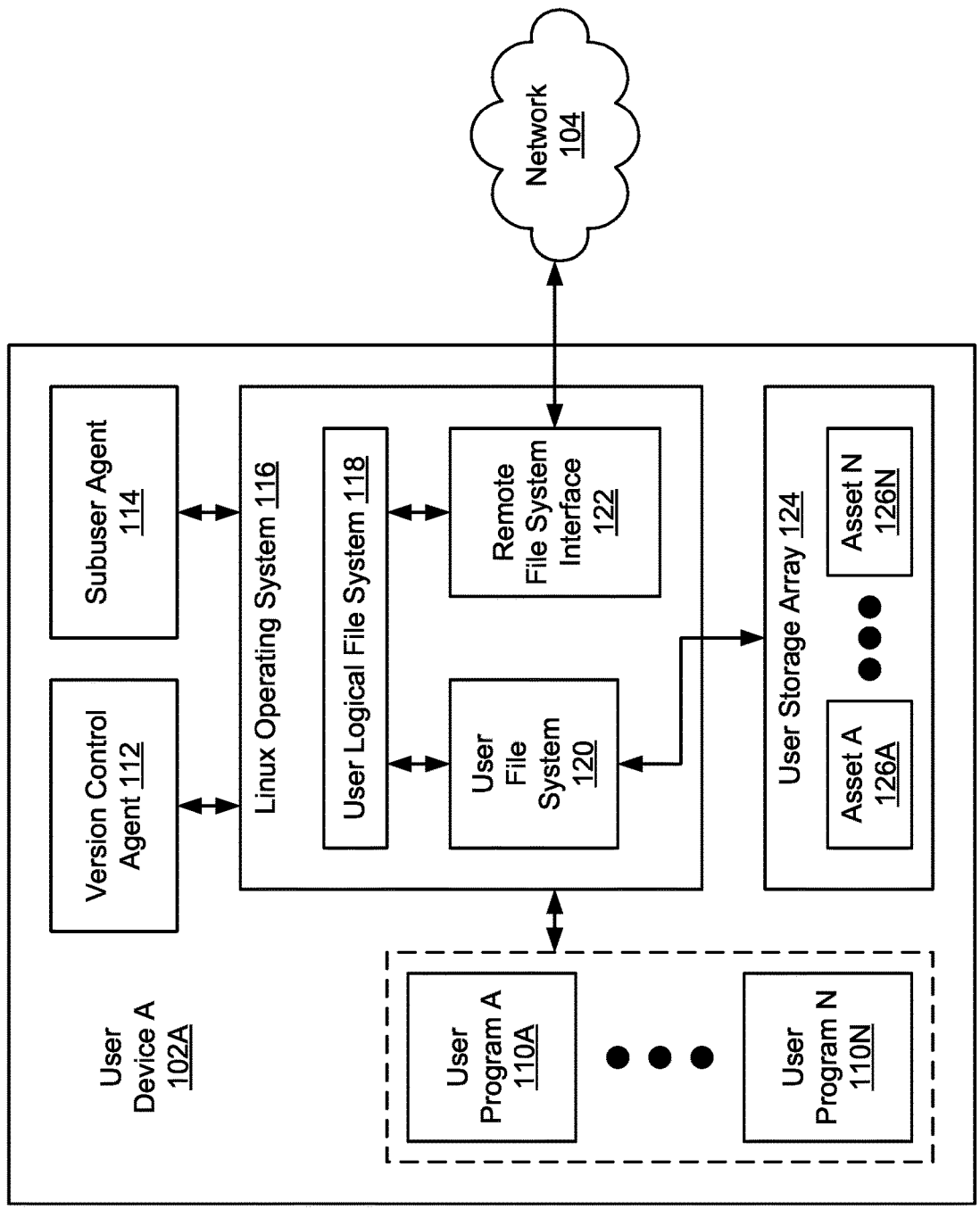
FIG. 1B shows a diagram of a user device in accordance with one or more embodiments disclosed herein.

FIG. 1B shows a user device in accordance with one or more embodiments disclosed herein. User device A (102A) may be an embodiment of a user device discussed above (e.g., 102A-N, FIG. 1A). User device A (102A) may include one or more user programs (110A-110N), a version control agent (112), a subuser agent (114), a Linux operating system (116), and a user storage array (124). User device A (102A) may include other, additional, or fewer component without departing from embodiments disclosed herein. Each of these user device A (102A) components is described below.

In one or more embodiments, a user program (110A-110N) may refer to a computer program (e.g., a set of computer instructions) that may execute on the underlying hardware of user device A (102A). Specifically, a user program (110A-110N) may be designed and configured to perform one or more functions, tasks, and/or activities instantiated by a user or a subuser of user device A (102A). Accordingly, towards performing these operations, a user program (110A-110N) may include functionality to request and consume user device (102) resources (e.g., computer processors, memory, storage (e.g., 124), virtualization, network bandwidth, etc.) by way of service calls to the Linux operating system (116). One of ordinary skill will appreciate that a user program (110A-110N) may perform other functionalities without departing from the scope of embodiments disclosed herein. Examples of a user program (110A-110N) may include, but are not limited to, a software development application, a word processor, an email user, a database user, a web browser, a media player, a file viewer, an image editor, a simulator, a computer game, or any other computer executable application.

In one or more embodiments, the version control agent (112) may refer to a computer program (e.g., computer instructions) that may execute on the underlying hardware of user device A (102A). Specifically, the version control agent (112) may be designed and configured to perform version control operations. To that extent, the version control agent (112) may manage one or more folders (also referred herein as assets (126A-126N)) on user device A (102A). The version control operations may include maintaining versions of files in a folder, logging changes made to folders and files by users and subusers, merging file changes using a version control directory (discussed below), and deleting files from a folder. The version control agent (112) may perform version control operations based on requests or commands obtained from a user of the user device (102A) and/or the subuser agent (114). One of ordinary skill will appreciate that the version control agent (112) may perform other and/or additional functionalities without departing from embodiments disclosed herein.

In one or more embodiments, the subuser agent (114) may refer to a computer program (e.g., computer instructions) that may execute on the underlying hardware of the user device (102A). Specifically, the subuser agent (114) may be designed and configured to perform subuser management services. To that extent, the subuser agent (114) may include functionality to perform one or more of the various steps outlined below with respect to FIGS. 2A-2B, which may be directed to facilitating the establishment of a subuser account for a subuser on user device A (102A) and removing the subuser account. As a result, a temporary subuser account may be generated to allow a subuser (e.g., a different user) to access and modify assets on user device A and then remove the subuser account as requested by the user. One of ordinary skill will appreciate that the subuser agent (114) may perform other and/or additional functionalities without departing from embodiments disclosed herein. For additional information regarding the functionality of the subuser agent, refer to FIGS. 2A-2B.

In one or more embodiments, the Linux operating system (116) may refer to a computer program that may execute on the underlying hardware of user device A (102A). Specifically, the Linux operating system (116) may be designed and configured to oversee user device (102) operations. To that extent, the Linux operating system (116) may include functionality to, for example, support fundamental user device A (102A) functions; manage user device users and subusers; manage access to assets (126A-126N) stored on the user device; schedule tasks; mediate interactivity between logical (e.g., software) and physical (e.g., hardware) user device A (102A) components; allocate user device A (102A) resources; and execute or invoke other computer programs executing on user device A (102A). One of ordinary skill will appreciate that the Linux operating system (116) may perform other functionalities without departing from embodiments disclosed herein.

For example, the Linux operating system (116) may facilitate user program (110A-110N) interaction with asset (126A-126N) data stored locally on user device A (102A) or remotely over the network (104). In facilitating the aforementioned interaction, the Linux operating system (116) may implement a user logical file system (118). The user logical file system (118) may represent a collection of in-memory data structures, maintained by the Linux operating system (116), to manage the various accessible asset (126A-126N) data stored locally on user device A (102A) and/or remotely on another computing device (e.g., user device B (102B)). Further, the user logical file system (118) may expose an application programming interface (API) through which the user program(s) (110A-110N) may manipulate—e.g., via one or more file operations—any granularity of locally and/or remotely stored asset (126A-126N) data. These file operations, requested by the user program(s) (110A-110N), may subsequently be delivered to the user file system (120) or remote file system interface (122) for processing.

In one or more embodiments, the user file system (120) may represent a physical file system (also referred to as a file system implementation). A physical file system may refer to a collection of subroutines concerned with the physical operation of one or more physical storage devices (described below). The user file system (120), in this respect, may be concerned with the physical operation of the user storage array (124). Accordingly, the user file system (120) may employ user storage array (124) device drivers (or firmware) (not shown) to process requested file operations from the user program(s) (110A-110N). The device drivers (or firmware) may enable the user file system (120) to manipulate physical storage or disk blocks as appropriate.

In one embodiment of the invention, the remote file system interface (122) may represent a computer program that may execute on the underlying hardware of user device A (102A). Specifically, the remote file system interface (122) may be designed and configured to facilitate the access and manipulation of remotely stored asset data as if the aforementioned database data were stored locally on user device A (102A). Additionally, the remote file system interface (122) may further facilitate the access of locally stored asset (126A-126N) data by users or subusers of remote user devices (e.g., 102B, 102N). Accordingly, the remote file system interface (122) may, in part, implement a distributed file system (DFS), which may employ any known DFS protocol (e.g., the network file system (NFS) protocol). A DFS may refer to a mechanism through which files (e.g., database data) may be stored and accessed based on user-server architecture over a network (104). Particularly, in a DFS, one or more central appliances (e.g., user device B (102B) or user device N (102N)) store files that can be accessed, with proper authorization permissions, by any number of remote users or subusers across the network (104). Furthermore, the remote file system interface (122) may include functionality to issue remote procedure calls (RPCs) directed to accessing and manipulating any granularity of database data remotely stored on the backup storage system (106). The embodiments disclosed herein are not limited to the aforementioned protocols.

In one or more embodiments, the user storage array (124) may refer to a collection of one or more physical storage devices (not shown) on which various forms of digital data—e.g., one or more assets (126A-126N) (described below)—may be consolidated. Each physical storage device may encompass non-transitory computer readable storage media on which data may be stored in whole or in part, and temporarily or permanently. Further, each physical storage device may be designed and configured based on a common or different storage device technology-examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the user storage array (124) may be implemented using volatile and/or non-volatile storage. Examples of storages may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or more embodiments, an asset (126A-126N) may represent a logical container to and from which related digital data, or any granularity thereof, may be stored and retrieved, respectively. An asset (126A-126N) may occupy a portion of a physical storage device or, alternatively, may span across multiple physical storage devices, of the user storage array (124). Furthermore, an asset (126A-126N) may refer to a composite of various logical objects including, but not limited to, one or more folders (not shown; described below).

In one or more embodiments of the invention, a folder may refer to a database object that includes one or more subfolders and/or one or more files. The folders of the assets (126A-126N) may be associated with a hierarchical structure with a single parent (or root) folder that includes files and subfolders. Each subfolder may include files and/or more subfolders, and so on. In one or more embodiments, a file stores asset data. Asset data may encompass any computer readable content (e.g., images, text, video, audio, machine code, source code, etc.), or a combination thereof, which may be generated, interpreted, and/or processed by any given user program (110A-110N).

While FIG. 1B shows a configuration of components, other user device A (102A) configurations may be used without departing from the embodiments disclosed herein.

Figure 2A:
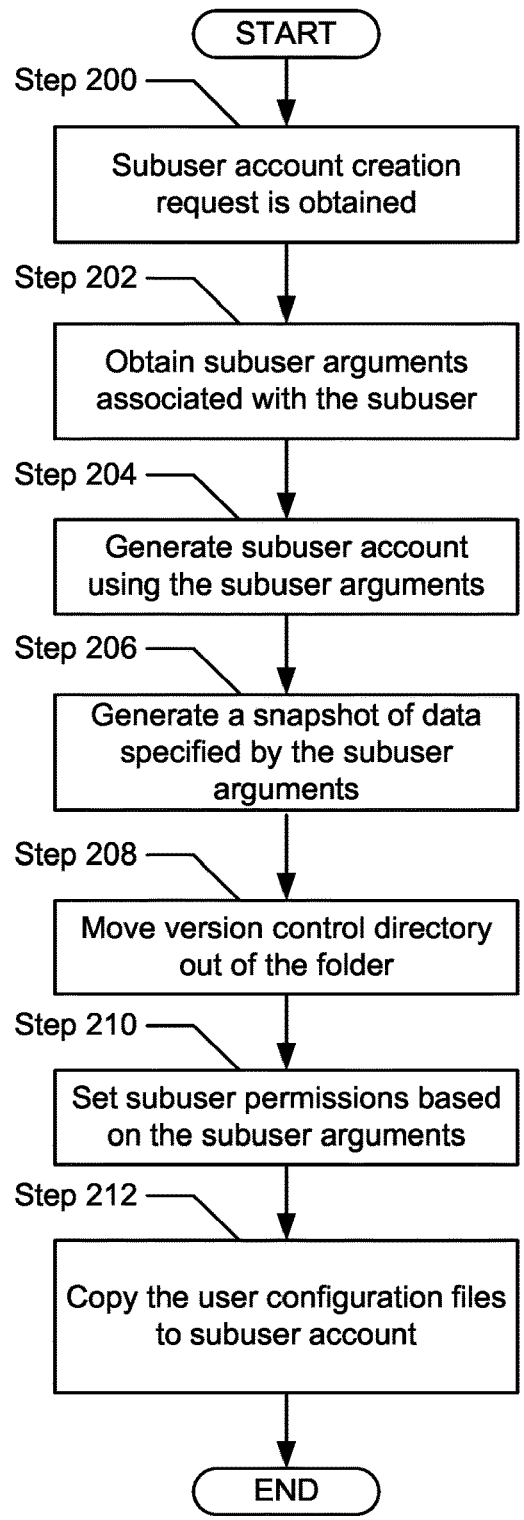
FIG. 2A shows a flowchart of a method for generating subuser account in accordance with one or more embodiments disclosed herein.

FIG. 2A shows a flowchart of a method for generating a subuser account in accordance with one or more embodiments disclosed herein. The method shown in FIG. 2A may be performed by, for example, a subuser agent (e.g., 114, FIG. 1B). Other components of the system in FIGS. 1A-1B may perform all, or a portion, of the method of FIG. 2A without departing from the scope of the embodiments described herein. While FIG. 2A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a subuser account creation request is obtained. In one or more embodiments, the subuser agent may obtain a subuser account creation request to create a subuser account from the user of the user device. The user may submit the request through a user interface (not shown in FIGS. 1A-1B). The user interface may be any type of user interface (e.g., a graphical user interface, a command-line interface, etc.) without departing from embodiments disclosed herein. The subuser account creation request may be obtained via other and/or additional methods without departing from embodiments disclosed herein.

In Step 202, subuser arguments associated with the subuser are obtained. In one embodiment, as discussed above, the subuser agent may obtain a request to create a subuser in Step 200. The request may include the subuser arguments. The subuser agent may parse the request to obtain the subuser arguments. In another embodiment, the user may separately submit the subuser arguments using user interface. The user interface may be any type of user interface (e.g., a graphical user interface, a command-line interface, etc.) without departing from embodiments disclosed herein. The subuser arguments may be obtained via other and/or additional methods without departing from embodiments disclosed herein.

In one or more embodiments, the subuser arguments may refer to one or more data structures that include information used by the subuser agent to generate the subuser account. The subuser arguments may include a subuser identifier (e.g., a unique combination of alphanumeric characters that specify a particular subuser) associated with a subuser corresponding to the subuser creation request. The subuser arguments may further include a folder identifier (e.g., a unique combination of alphanumeric characters that specify a particular folder) and/or a path associated with the folder corresponding to the folder which the user desires to grant the subuser access. The user may only desire to grant subuser access to a portion of the data in the folder (e.g., one or more files in the folder). In such scenarios, the subuser arguments may further include a one or more file names associated with files that include user data that the user would like to grant the subuser access. The subuser arguments may include file names associated with all, or a portion, of the files included in the folder without departing from embodiments disclosed herein. In other embodiments disclosed herein, the user may desire to grant the subuser access to all, or a portion of, the data in one or more folders. In such embodiments, the subuser arguments may include multiple folder names and/or paths one or more file names associated with each folder without departing from embodiments disclosed herein. A path may refer to a string of characters used to uniquely identify a location in a directory or file system structure.

The subuser arguments may further include a permission type, removal information, and security information. The permission type may specify the access to the folder that the user has. In other words, the permission type may specify whether the subuser may read files from the folder and/or subfolders, write new files and/or subfolders to the folder, edit files and/or subfolders of the folder, and/or delete files and/or subfolders from the folder. The removal information may specify a removal event which triggers the removal of the subuser account. The removal event may be one or more of the following: an elapse of a configurable time period, an exceedance of a modification threshold specifying the maximum amount of modifications that the subuser may perform, an unauthorized access attempt by the subuser (e.g., attempting to access a folder other than the folder associated with the subuser account), receipt of removal request from the user, and receipt of removal request from the subuser. The removal event may include other and/or additional events without departing from embodiments disclosed herein. The security information may include any information that may be used by the subuser to log into the subuser account or access the folder without departing from embodiments disclosed herein. The security information may include, for example, a password, a username, a public key, etc. The subuser arguments may include other and/or additional information that may be used to generate a subuser account without departing from embodiments disclosed herein.

In Step 204, a subuser account is generated using the subuser arguments. In one or more embodiments, the subuser agent may generate the subuser account using the subuser arguments. The subuser agent may submit one or more commands to the Linux operating system. The commands may include one or more of the subuser arguments (e.g., subuser identifier, subuser username, subuser password, etc.). In response to receiving the commands, the Linux operating system may generate the subuser account. The Linux operating system may also generate a subuser directory associated with the subuser account. The subuser account may be generated via other and/or additional methods without departing from embodiments disclosed herein.

In Step 206, a snapshot of data specified by the subuser arguments is generated. In one or more embodiments, the folder may include the user's data (e.g., project files, text files, video files, etc.). In one or more embodiments, the subuser agent may generate a snapshot of all, or a portion of, the folder or otherwise initiate generation (e.g., by submitting one or more commands to the Linux operating system) of a snapshot of all, or a portion of, the folder based on the subuser arguments. As discussed above, the folder and one or more files of the folder may be the folder specified in the subuser arguments. The snapshot may be stored or otherwise included in a version control directory. As a result, the version control directory and the snapshot may be used to restore, all or a portion of, the folder to its state immediately prior to providing the subuser access to the folder in case the subuser performs any undesirable actions (e.g., deleting files, incorrectly modifying files, etc.). In one or more embodiments, the version control directory may refer to a subfolder or repository that includes version control information. The version control information may include, but not be limited to, snapshots associated with previous states of the folder, file versions, file history logs specifying changes to files and the users that performed the changes, etc. The version control directory may be used to save changes to files and subfolders of the folder, restore files or subfolders to previous states, and provide a history of the folder. The version control directory may be, for example, a .git folder. Other and/or additional types of version control directories may be used without departing from embodiments disclosed herein. The snapshot of the folder may be generated via other and/or additional methods without departing from embodiments disclosed herein.

In Step 208, a version control directory is removed from the folder. In one or more embodiments, the version control directory associated with the folder to which access is being granted to the user may reside in the folder. In one or more embodiments, the subuser agent may move the version control directory out of the folder to which access is being granted to the subuser. The version control directory may, for example, be moved up a folder (e.g., to the parent folder of the folder to which access is being granted to the subuser). The version control directory may be moved anywhere that the subuser does not have access to without departing from embodiments disclosed herein. As a result, the subuser may not have access to the version control directory and permanently alter the version control directory or the folder, preventing the subuser from performing nefarious or otherwise undesirable actions that cannot be reversed. The version control directory may be removed from the folder via other and/or additional methods without departing from embodiments disclosed herein.

In Step 210, subuser permissions are set based on the subuser arguments. In one or more embodiments, the subuser agent may set the subuser permissions by modifying an access control list (ACL) associated with the folder. In one or more embodiments, an ACL may refer to one or more data structures that may include a list of permissions associated with one or more folders. The permissions in the ACL may specify one or more users that have access to a particular folder and the corresponding permission type associated with each user. The ACL may prevent unauthorized users from accessing folders and may also prevent unauthorized operations from being performed on folders. The subuser may directly modify the ACL or submit commands to the Linux operating system to modify the ACL. The ACL may be modified to include the subuser identifier and/or username and the permission type specified in the subuser arguments obtained in Step 202. For additional information regarding permission types or subuser arguments, refer to Step 202. The subuser permissions may be set based on the subuser arguments via other and/or additional methods without departing from embodiments disclosed herein.

In Step 212, user configuration files are associated with the subuser account. In one or more embodiments, the subuser agent may associate the configuration files corresponding to the user with the subuser account. The configuration files may include, for example, a .bashrc file. The configuration files may include other and/or additional types of configuration files without departing from embodiments disclosed herein. The subuser agent may, for example, copy the configuration files from the user directory associated with the user to the subuser directory associated with the subuser. As a result, the user account and the subuser account may have the same configuration files and therefore configuration settings, thereby preventing incompatibility issues that may prevent the subuser from accessing or modifying the folder or its files. The user configuration files may be associated with the subuser account via other and/or additional methods without departing from embodiments disclosed herein.

In one or more embodiments, after Step 212, the subuser agent may notify the user that the subuser account is created and ready for the subuser to access the folder using the subuser account, thereby initiating subuser access of the folder.

In one or more embodiments disclosed herein, the method ends following Step 212.

After Step 212, the user may provide the subuser with access materials (e.g., security information) that may enable the subuser to login to the subuser account. The subuser may then use the subuser account to access the user's folder. The subuser may also perform modifications to the folder based on the permissions associated with subuser account. The modifications may include editing files or subfolders in the folder, writing new files or new subfolders in the folder, and/or deleting files and/or subfolders in the folder. The modifications may include other and/or additional operations performed on the contents of the folder without departing from embodiments disclosed herein.

Figure 2B:
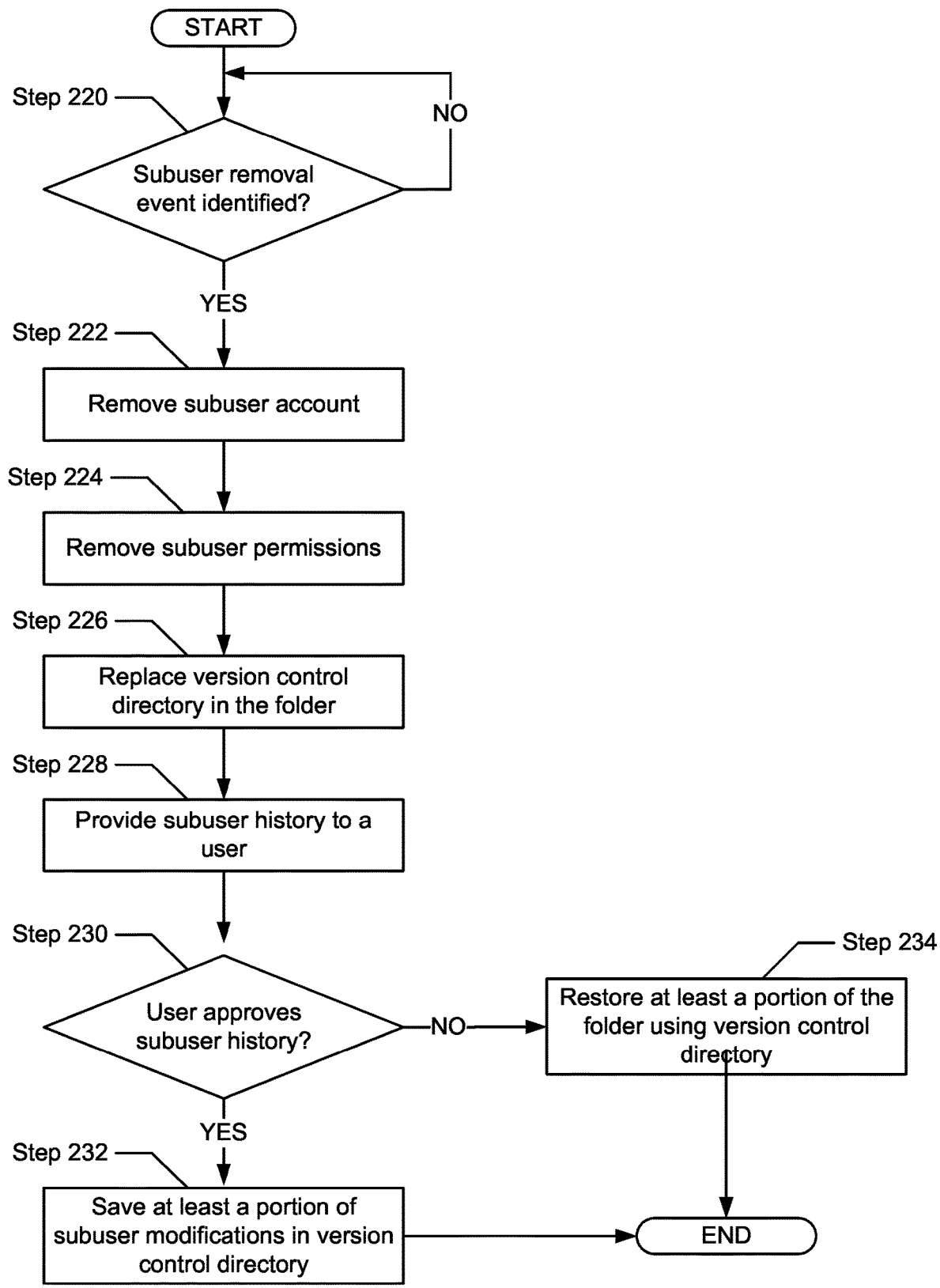
FIG. 2B shows a flowchart of a method for subuser account in accordance with one or more embodiments disclosed herein.

FIG. 2B shows a flowchart of a method for removing a subuser in accordance with one or more embodiments disclosed herein. The method shown in FIG. 2B may be performed by, for example, a subuser agent (e.g., 114, FIG. 1B). Other components of the system in FIGS. 1A-1B may perform all, or a portion, of the method of FIG. 2B without departing from the scope of the embodiments described herein. While FIG. 2B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 220, a determination is made as to whether a subuser removal event is identified. As discussed above, a subuser account may be generated using subuser arguments. The subuser arguments may include removal information. The subuser agent may include a list of active subuser accounts and the removal information associated with each subuser account. Also as discussed above, the removal information may specify a removal event which triggers the removal of the subuser account. The removal event may be one or more of the following: an elapse of a configurable time period, an exceedance of a modification threshold specifying the maximum amount of modifications that the subuser may perform, an unauthorized access attempt by the subuser (e.g., attempting to access a folder other than the folder associated with the subuser account), receipt of removal request from the user, and receipt of removal request from the subuser. The subuser agent may monitor subuser activity and identify the occurrence of one of the removal events associated with a subuser. In one or more embodiments, if a removal event specified by the removal information associated with a subuser occurs, then the subuser agent may determine that a removal event has been identified. In one or more embodiments, if none of the removal events specified by the removal information associated with a subuser has occurred, then the subuser agent may determine that a removal event has not been identified. The determination as to whether a removal event has been identifier may be made via other and/or additional methods without departing from embodiments disclosed herein.

In one or more embodiments disclosed herein, if it is determined that a subuser event is identified, then the method may proceed to Step 222. In one or more embodiments disclosed herein, if it is determined that a subuser event is not identified, then the method may repeat Step 220 to wait for a subuser removal event.

In Step 222, the subuser account is removed. In one or more embodiments, the subuser agent may submit one or more commands to the Linux operating system. The commands may include one or more of the subuser arguments (e.g., subuser identifier, subuser username, subuser password, etc.). In response to receiving the commands, the Linux operating system may remove or otherwise delete the subuser account and remove anyone logged into the user device under that subuser account. The Linux operating system may also delete the subuser directory associated with the subuser account. The subuser account may be removed via other and/or additional methods without departing from embodiments disclosed herein.

In Step 224, the subuser permissions are removed. In one or more embodiments, the subuser agent may remove the subuser permissions associated with the subuser account by modifying the ACL associated with the folder. The subuser may directly modify the ACL or submit commands to the Linux operating system to modify the ACL. The ACL may be modified to remove the subuser identifier and/or username and the permission type specified in the subuser arguments obtained in Step 202. The subuser permissions may be removed via other and/or additional methods without departing from embodiments disclosed herein.

In one or more embodiments disclosed herein, if the subuser only had read only access to the folder, then the method may end after Step 224 because the subuser could not modify the folder.

In Step 226, the version control directory is replaced in the folder. In one or more embodiments, the subuser agent may move the version control directory from its temporary location back into the folder. The version control directory may be replaced in the folder via other and/or additional methods without departing from embodiments disclosed herein.

In Step 228, a subuser history is provided to the user. In one or more embodiments, the subuser agent may use the version control directory to provide the subuser history to the user. The subuser agent may provide the subuser history through a user interface (not shown in FIGS. 1A-1B). The user interface may include, but not be limited to, a graphical user interface, a command-line interface, or a web page interface. The subuser agent may populate the user interface with all or a portion of the information included in the version control directory and new folder contents after the subuser was removed. As a result, the user may have a comprehensive view of a history of modifications performed on the folder contents by the subuser as tracked by the version control agent and stored in the version control directory. This view may be referred to as the subuser history, which may be compared with previous versions or states of the folder and its contents by the user through the user interface. The subuser history may be provided to the user via other and/or additional methods without departing from embodiments disclosed herein.

In Step 230, a determination is made as to whether the user approves the subuser history. In one or more embodiments, the subuser agent may prompt the user to approve or reject all, or a portion of, the subuser history through the user interface discussed above in Step 228. In response to the prompt, the user may indicate whether they reject or accept all, or a portion of, the subuser history (e.g., by clicking one or more buttons, or entering a command) through the user interface. For example, a user may approve the subuser modifications to a first file in the folder but reject the subuser modifications to a second file in the folder. As another example, the user may accept all of the subuser modifications. As yet another example, the user may reject all of the subuser modifications. In one or more embodiments disclosed herein, if the user indicates that they approve the subuser history though the user interface, then the subuser agent may determine that the user approves the subuser history. In one or more embodiments disclosed herein, if the user indicates that they reject the subuser history through the user interface, then the subuser agent may determine that the user does not approve the subuser history.

In one or more embodiments disclosed herein, if it is determined that the user approves the subuser history, then the method proceeds to Step 232. In one or more embodiments disclosed herein, if it is determined that the user rejects the subuser history, then the method proceeds to Step 234. In one or more embodiments disclosed herein, Steps 230, 232 and/or 234 may be repeated one or more times for each portion of the folder (e.g., each file, each subfolder, etc.) for which the user accepts or rejects the corresponding subuser history without departing from embodiments disclosed herein.

In Step 232, at least a portion of the subuser modifications are saved in the version control directory. As discussed above, the user may indicate that they accept all, or a portion, of the subuser modifications based on the subuser history. In one or more embodiments, the subuser agent may generate a snapshot of at least a portion of the folder or otherwise initiate generation (e.g., by submitting one or more commands to the Linux operating system) of a snapshot of at least a portion of the folder. The snapshot may then be stored or otherwise included in a version control directory. As a result, the user-approved state of all, or a portion, of the folder immediately after the subuser is removed may be saved in the version control directory. The subuser modification may be saved in the version control directory via other and/or additional methods without departing from embodiments disclosed herein.

In one or more embodiments disclosed herein, the method ends following Step 232.

In Step 234, at least a portion of the folder is restored using the version control directory. As discussed above, a snapshot may be generated and stored or otherwise included in the version control directory immediately prior to granting access of the folder to the subuser. Also, as discussed above, the user may indicate that they reject all, or a portion of, the subuser modifications. The subuser may use that snapshot and the version control directory to restore the all, or a portion of, the folder to the state immediately prior to granting access of the folder to the subuser, thereby reversing all, or a portion of, the subuser modifications. The folder may be restored using the version control directory via other and/or additional methods without departing from embodiments disclosed herein.

In one or more embodiments disclosed herein, the method ends following Step 234.

Figure 3:
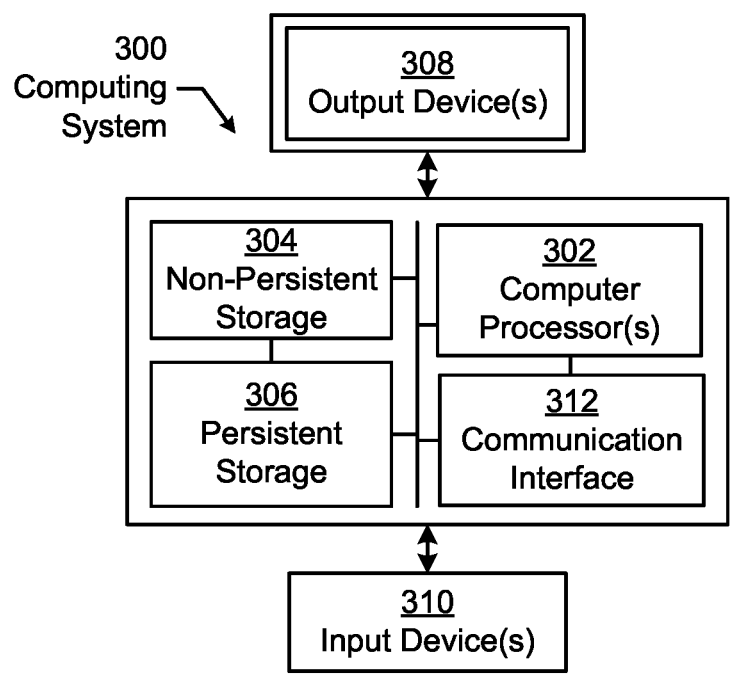
FIG. 3 shows a diagram of an example computing device in accordance with one or more embodiments disclosed herein.

As discussed above, embodiments of the invention may be implemented using computing devices. FIG. 3 shows a diagram of an example computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing user device users, comprising:
in response to obtaining a subuser account creation request:
obtaining subuser arguments from a user of a user device specifying:
a folder of a user file system, and
a subuser;
generating a subuser account for the subuser and setting subuser permissions based on the subuser arguments;
generating a snapshot of data specified by the subuser arguments before the subuser makes any modifications to the data;
updating a version control directory in the folder with the snapshot, wherein the version control directory is used to maintain versions of files, log changes made to the folder and the files, and merge the changes made to the files;
moving the version control directory from the folder to a location where the subuser does not have access;
associating user configuration files to the subuser account;
notifying the user that the subuser account is created and ready for the subuser to access;
after the notifying:
initiating subuser access of the folder based on the subuser permissions and the user configuration files, wherein the subuser performs modifications to at least one file included in the folder;
identifying a subuser removal event associated with the subuser, wherein the subuser removal event comprises:
an exceedance of a modification threshold, wherein the modification threshold specifies an amount of modifications the subuser can perform, wherein the amount is a plurality of modifications, and
an unauthorized access attempt by the subuser; and
in response to the subuser removal event:
removing the subuser account and the subuser permissions; and providing a subuser history to the user, wherein the subuser history includes a plurality of modifications that the subuser made to contents of the folder.

2. The method of claim 1, wherein a Linux operating system is installed on the user device.

3. The method of claim 1, wherein the subuser arguments comprise:
   a subuser identifier associated with the subuser;
   a folder identifier associated with the folder; and
   security information associated with the subuser.

4. The method of claim 1, wherein the subuser permissions specify that the subuser is permitted to:
   access the folder; and
   perform the modifications to the at least one file or at least one subfolder in the folder.

5. The method of claim 1, wherein providing the subuser history to the user further comprises:
   making a second determination that the user approves at least a portion of the subuser history; and
   in response to the second determination:
      saving the at least a portion of the modifications in the version control directory.

6. The method of claim 1, wherein providing the subuser history to the user further comprises:
   making a second determination that the user rejects at least a portion of the subuser history; and
   in response to the second determination:
      restoring at least a portion of the folder.

7. A non-transitory computer readable medium comprising computer readable program code, which when executed by a computer processor enables the computer processor to perform a method for managing user device users, the method comprising:
   in response to obtaining a subuser account creation request:
      obtaining subuser arguments from a user of a user device specifying:
         a folder of a user file system, and
         a subuser;
      generating a subuser account for the subuser and setting subuser permissions based on the subuser arguments;
      generating a snapshot of data specified by the subuser arguments before the subuser makes any modifications to the data;
      updating a version control directory in the folder with the snapshot, wherein the version control directory is used to maintain versions of files, log changes made to the folder and the files, and merge the changes made to the files;
      moving the version control directory from the folder to a location where the subuser does not have access;
      associating user configuration files to the subuser account;
      notifying the user that the subuser account is created and ready for the subuser to access;
      after the notifying:
         initiating subuser access of the folder based on the subuser permissions and the user configuration files, wherein the subuser performs modifications to at least one file included in the folder;
         identifying a subuser removal event associated with the subuser, wherein the subuser removal event comprises:
            an exceedance of a modification threshold, wherein the modification threshold specifies an amount of modifications the subuser can perform, wherein the amount is a plurality of modifications, and
            an unauthorized access attempt by the subuser; and
         in response to the subuser removal event:
            removing the subuser account and the subuser permissions; and
            providing a subuser history to the user, wherein the subuser history includes a plurality of modifications that the subuser made to contents of the folder.

8. The non-transitory computer readable medium of claim 7, wherein a Linux operating system is installed on the user device.

9. The non-transitory computer readable medium of claim 7, wherein the subuser arguments comprise:
   a subuser identifier associated with the subuser;
   a folder identifier associated with the folder; and
   security information associated with the subuser.

10. The non-transitory computer readable medium of claim 7, wherein the subuser permissions specify that the subuser is permitted to:
    access the folder; and
    perform the modifications to the at least one file or at least one subfolder in the folder.

11. The non-transitory computer readable medium of claim 7, wherein providing the subuser history to the user further comprises:
    making a second determination that the user approves at least a portion of the subuser history; and
    in response to the second determination:
       saving at least a portion of the modifications in the version control directory.

12. The non-transitory computer readable medium of claim 7, wherein providing the subuser history to the user further comprises:
    making a second determination that the user rejects at least a portion of the subuser history; and
    in response to the second determination:
       restoring at least a portion of the folder.

13. A system for managing user device users, comprising:
    a user device; and
    a subuser agent of the user device, programmed to:
       in response to obtaining a subuser account creation request:
          obtain subuser arguments from a user of a user device specifying:
             a folder of a user file system, and
             a subuser;
          generate a subuser account for the subuser and setting subuser permissions based on the subuser arguments;
          generate a snapshot of data specified by the subuser arguments before the subuser makes any modifications to the data;
          update a version control directory in the folder with the snapshot, wherein the version control directory is used to maintain versions of files, log changes made to the folder and the files, and merge the changes made to the files;
          move the version control directory from the folder to a location where the subuser does not have access;
          associate user configuration files to the subuser account;

notify the user that the subuser account is created and ready for the subuser to access;

after the notifying:

initiate subuser access of the folder based on the subuser permissions and the user configuration files, wherein the subuser performs modifications to at least one file included in the folder;

identify a subuser removal event associated with the subuser, wherein the subuser removal event comprises:

an exceedance of a modification threshold, wherein the modification threshold specifies an amount of modifications the subuser can perform, wherein the amount is a plurality of modifications, and an unauthorized access attempt by the subuser; and in response to the subuser removal event:

removing the subuser account and the subuser permissions; and providing a subuser history to the user, wherein the subuser history includes a plurality of modifications that the subuser made to contents of the folder.

14. The system of claim 13, wherein a Linux operating system is installed on the user device.

15. The system of claim 13, wherein the subuser arguments comprise:

a subuser identifier associated with the subuser;

a folder identifier associated with the folder; and security information associated with the subuser.

16. The system of claim 13, wherein the subuser permissions specify that the subuser is permitted to:

access the folder; and perform the modifications to the at least one file or at least one subfolder in the folder.

* * * * *